US012624743B2

(12) United States Patent (10) Patent No.: US 12,624,743 B2

Shim et al. (45) Date of Patent: May 12, 2026

(54) ORIENTATION STABILIZING DEVICE

(71) Applicant: SEOROBOTICS CO., LTD.,
Anyang-si (KR)

(72) Inventors: Jae Ik Shim, Seoul (KR); Sung Wook Jo, Suwon-si (KR); Young Jun Lee, Gunpo-si (KR)

(73) Assignee: SEOROBOTICS CO., LTD.,
Anyang-si (KR)

( * ) Notice: Subject to any disclaimer, the term of this patent is extended or adjusted under 35 U.S.C. 154(b) by 0 days.

(21) Appl. No.: 19/147,701

(22) PCT Filed: Aug. 11, 2023

(86) PCT No.: PCT/KR2023/011932

§ 371 (c)(1),
(2) Date: Jul. 13, 2025

(87) PCT Pub. No.: WO2024/154882

PCT Pub. Date: Jul. 25, 2024

(65) Prior Publication Data

US 2025/0354601 A1 Nov. 20, 2025

(30) Foreign Application Priority Data

Jan. 16, 2023 (KR) ........................ 10-2023-0006123

(51) Int. Cl.
*G01C 19/04* (2006.01)
*B25J 19/00* (2006.01)
*F16F 15/315* (2006.01)
(52) U.S. Cl.
CPC ......... *F16F 15/315* (2013.01); *B25J 19/0008* (2013.01)

(58) Field of Classification Search
CPC .......... Y10T 74/12; B64G 1/28; B64G 1/286; G01C 19/06; G01C 19/04; B25H 19/0008; F16F 15/315
(Continued)

(56) References Cited

U.S. PATENT DOCUMENTS

2024/0270354 A1 * 8/2024 Salutari .................. H02K 7/083

FOREIGN PATENT DOCUMENTS

KR 10-2014-0116772 A 10/2014
KR 101553822 B1 * 9/2015 ............. B66C 13/18
(Continued)

OTHER PUBLICATIONS

"[Science Principle Experience]@HOME -Bicycle Wheel Gyro-". Posted by National Gwacheon Science Museum on youtube.com. May 17, 2020. URL: <https://youtu.be/DNnxg-pzCYI>.
(Continued)

*Primary Examiner* — Gregory Robert Weber
(74) *Attorney, Agent, or Firm* — Bridgeway IP Law Group, PLLC; Sang Ho Lee; Hyun Woo Shin

(57) ABSTRACT

Provided is an orientation-stabilizing device, including: a motor stator having a coil disposed on an outer circumferential surface of a center shaft, the coil being magnetized when electricity flows through it; a motor rotor made of a permanent magnetic material, disposed outside the coil, and configured to rotate in response to the magnetism; a flywheel having a central inner circumferential surface fixed to the motor rotor to rotate together with the motor rotor; a cover installed on the center shaft and configured to surround the flywheel; and a bearing installed between the flywheel and the cover, and configured to allow the flywheel to rotate in an aligned state inside the cover, wherein the motor stator and the motor rotor do not protrude toward a surface of the cover.

3 Claims, 5 Drawing Sheets

(58) Field of Classification Search
USPC .......................................................... 74/469
See application file for complete search history.

(56) References Cited

FOREIGN PATENT DOCUMENTS

| KR | 10-2016-0099936 | A | 8/2016 |
| KR | 10-1831157 | B1 | 4/2018 |
| KR | 10-2391562 | B1 | 4/2022 |
| WO | 2022-234080 | A1 | 11/2022 |

OTHER PUBLICATIONS

"Seakeeper Gyroscopic Stabilizer, Schwartz, Cal Poly Physics". Posted by Peter Schwartz on youtube.com. Nov. 27, 2016. URL: <https://youtu.be/Gaffw84ljx4?t=22>.
"DW Studio Ltd: SeaKeeper—Gyro Stabilisers (English)". Posted by DW Studio Ltd on youtube.com. Nov. 10, 2014. URL: <https://youtu.be/gwQbtU6Wa04?t=71>.

* cited by examiner

ORIENTATION STABILIZING DEVICE

TECHNICAL FIELD

The present invention relates to an orientation-stabilizing device that is installed on an object and corrects the orientation of the object when it is tilted.

BACKGROUND ART

In general, when an object moves, it can be tilted due to external environmental factors. For example, land-based vehicles or robots moving along a surface may tilt depending on the condition of the ground, and at sea, a vessel may sway due to wind or waves.

In any case, the object needs to maintain its initial orientation, minimize tilting, or be restored to its initial orientation if it is tilted.

For example, a gyro stabilizer may be mounted on a vessel. In the gyro stabilizer, the axis of an inertial wheel is connected to a motor, and as the motor operates to rotate the inertial wheel, a force is generated in the direction of tilt when the wheel's axis is tilted due to external influences. This force can stabilize the vessel's swaying motion.

The gyro stabilizer installed on the vessel, as described above, has a configuration in which the axis of the inertial wheel extends outward from a case, and the motor's driving force is connected to the extended axis of the inertial wheel. That is, the gyro stabilizer installed on the vessel has a very large external size, and in particular, a portion connected to the motor protrudes outward, further increasing the overall external dimensions.

In addition, the gyro stabilizer installed on the vessel requires a wide and large space to prevent interference even when the inertial wheel tilts.

In another example, if an unmanned robot is used to deliver soup-based food, the robot may tilt due to surface conditions, causing the soup to spill. Therefore, it is necessary to correct the orientation of the unmanned robot to prevent spillage.

In another example, a personal mobility device (such as an electric kickboard) may have one front wheel installed at the front of a board and one rear wheel installed at the rear of the board, and either the front wheel or the rear wheel can be driven by the power of a motor. Such a personal mobility device needs to maintain balance on its own without requiring a rider to actively balance, to prevent the rider from losing balance, falling, and getting injured.

That is, it may be attempted to place a gyro stabilizer on a personal mobility device to help maintain balance and prevent tipping. However, the conventionally known gyro stabilizers are large in size, making it difficult to install them in an appropriate position on the personal mobility device.

Meanwhile, unmanned delivery robots are being developed. An unmanned delivery robot may be additionally equipped with numerous electrical and electronic devices, such as a storage compartment for carrying goods, a battery for power supply, communication equipment, and cameras.

To increase the loading capacity of an unmanned delivery robot, it is necessary to increase the battery capacity and adopt higher-specification motors. However, this leads to the problem of requiring a larger overall size of the unmanned delivery robot. In reality, for safety reasons, the external dimensions of the unmanned delivery robot cannot be made infinitely large.

That is, since the unmanned delivery robot has limited space available for installing various components, and that space must accommodate a variety of electrical and electronic devices including the aforementioned battery, there is a problem in that conventionally known gyro stabilizers cannot be applied as-is without design modification.

RELATED ART DOCUMENTS

Patent Documents (Patent Document 1) KR 10-1831157 B1
(Patent Document 2) KR 10-2391562 B1

Non-Patent Documents (Patent Document 1) 1. Video posted on YouTube, [Science Principle Experience]@HOME-Bicycle Wheel Gyro-Posted on: May 18, 2020, URL: https://youtu.be/DNnxg-pzCYI
(Patent Document 2) 2. Video posted on YouTube, Seakeeper Gyroscopic Stabilizer, Schwartz, Cal Poly Physics, Posted on: Nov. 28, 2016, URL: https://youtu.be/Gaffw84Ijx4?t=22
(Patent Document 3) 3. Video posted on YouTube, DW Studio Ltd: SeaKeeper-Gyro Stabilisers (English), Posted on: Nov. 11, 2014, URL: https://youtu.be/gwQbtU6Wa04?t=71

DISCLOSURE

Technical Problem

Therefore, the present invention has been made in view of the above problems, and it is one object of the present invention to provide an orientation-stabilizing device that minimizes the occupied space within an object by reducing its external size, and that allows for a wider tilting range so that the orientation of the object can be corrected even when the object is significantly tilted.

Technical Solution

In accordance with an aspect of the present invention, the above and other objects can be accomplished by the provision of an orientation-stabilizing device, including: a motor stator 10 having a coil 13 disposed on an outer circumferential surface of a center shaft 12, the coil 13 being magnetized when electricity flows through it; a motor rotor 16 made of a permanent magnetic material, disposed outside the coil 13, and configured to rotate in response to the magnetism; a flywheel 20 having a central inner circumferential surface 22 fixed to the motor rotor 16 to rotate together with the motor rotor 16; a cover 40 installed on the center shaft 12 and configured to surround the flywheel 20; and a bearing 30 installed between the flywheel 20 and the cover 40, and configured to allow the flywheel 20 to rotate in an aligned state inside the cover 40, wherein the motor stator 10 and the motor rotor 16 do not protrude toward a surface 41 of the cover 40.

In addition, an outer ring 34 of the bearing 30 may be installed on an inner circumferential surface 24 of the flywheel 20, and an inner ring 32 of the bearing 30 may be installed on the cover 40.

In addition, a first clearance groove 28 may be formed on a first side surface 26 of the flywheel 20 to prevent the inner ring 32 from interfering with the flywheel 20, and a second clearance groove 50 may be formed on a second side surface 46 of the cover 40 to prevent the outer ring 34 from interfering with the cover 40.

In addition, a first key 14 may be formed at an end of the center shaft 12, a second key 44 may be formed in a center hole 42 of the cover 40, and the first key 14 and the second key 44 may be assembled together to fix the motor stator 10 and the cover 40 so that they do not rotate relative to each other.

In addition, a third side surface 48 may be formed around the center hole 42 inside the cover 40, and the third side surface 48 may be in close contact with a shaft side surface 15 of the center shaft 12, thereby fixing the motor stator 10 and the cover 40 so that they do not move in a longitudinal direction of the center shaft 12.

Specific details of other embodiments are included in the detailed description and the drawings.

Advantageous Effects

In an orientation-stabilizing device according to an embodiment of the present invention, its external size can be reduced by arranging motor components inside a cover 40. As a result, the occupied space within an object can be minimized, and a tilting range can be maximized within the limits of an available space, thereby providing the effect of correcting the orientation of the object more quickly and accurately, even when the object is significantly tilted.

BEST MODE FOR CARRYING OUT THE INVENTION

Figure 1:
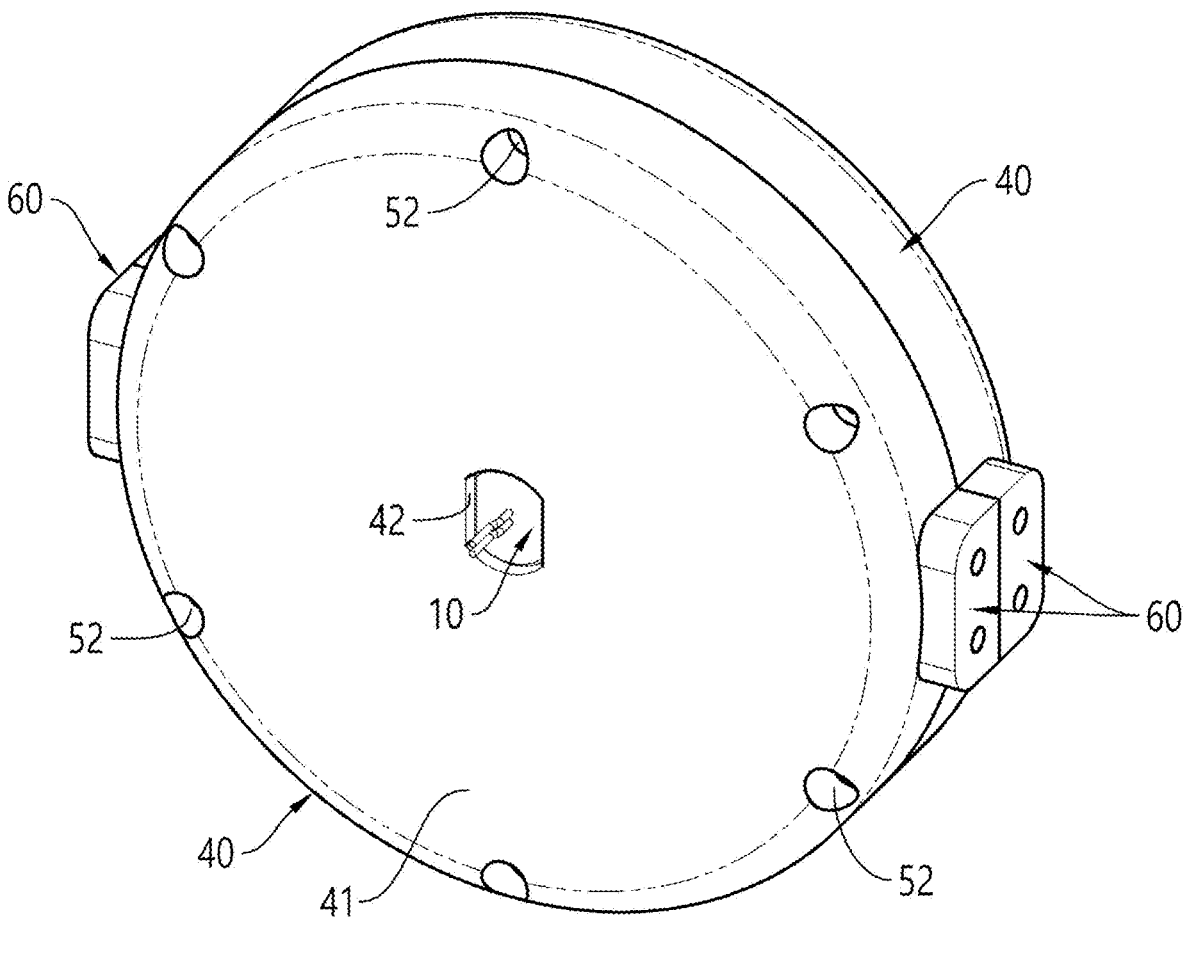
FIG. 1 is a diagram for illustrating an orientation-stabilizing device according to an embodiment of the present invention.

The advantages and features of the present invention and the method of achieving them will become apparent with reference to the embodiments described in detail below together with the accompanying drawings.

Hereinafter, an embodiment of the present invention will be described in detail with reference to the accompanying drawings. The embodiment described below is provided as an example to help understand the present invention, and it should be understood that the present invention can be implemented in various ways different from the embodiment described herein. However, in the following description of the present invention, a detailed description of known functions and configurations incorporated herein will be omitted when it may make the subject matter of the present invention unclear. In addition, the accompanying drawings are not drawn to their actual scales and some components may be drawn with exaggerated sizes to help understand the invention.

Meanwhile, terms such as first, second, etc. may be used to describe various components, but the components should not be limited by the terms. The terms are used solely for the purpose of distinguishing one component from another. For example, without going beyond the scope of the present invention, the first component may be named the second component, and similarly, the second component may also be named the first component.

On the other hand, the terms described below are terms established in consideration of their functions in the present invention and thus may vary depending on the intention of a producer or custom. Accordingly, the definitions of the terms should be understood on the basis of the entire description of the present specification.

Throughout the specification, like reference numerals denote like elements.

| [Description of Symbols] | |
| --- | --- |
| 1: stabilizer | 2: base plate |
| 3a, 3b: first and second motors | |
| 10: motor stator | 12: center shaft |
| 14, 44: first and second keys | 16: motor rotor |
| 20: flywheel | 22: central inner circumferential surface |
| 24: inner circumferential surface | 26, 46, 48: first, second and third side surfaces |
| 28, 50: first and second clearance grooves | |
| 30: bearing | 32: inner ring |
| 34: outer ring | |
| 40: cover | 42: center hole |
| 52: fastening hole | 60: coupling part |

MODE FOR CARRYING OUT THE INVENTION

Figure 2:
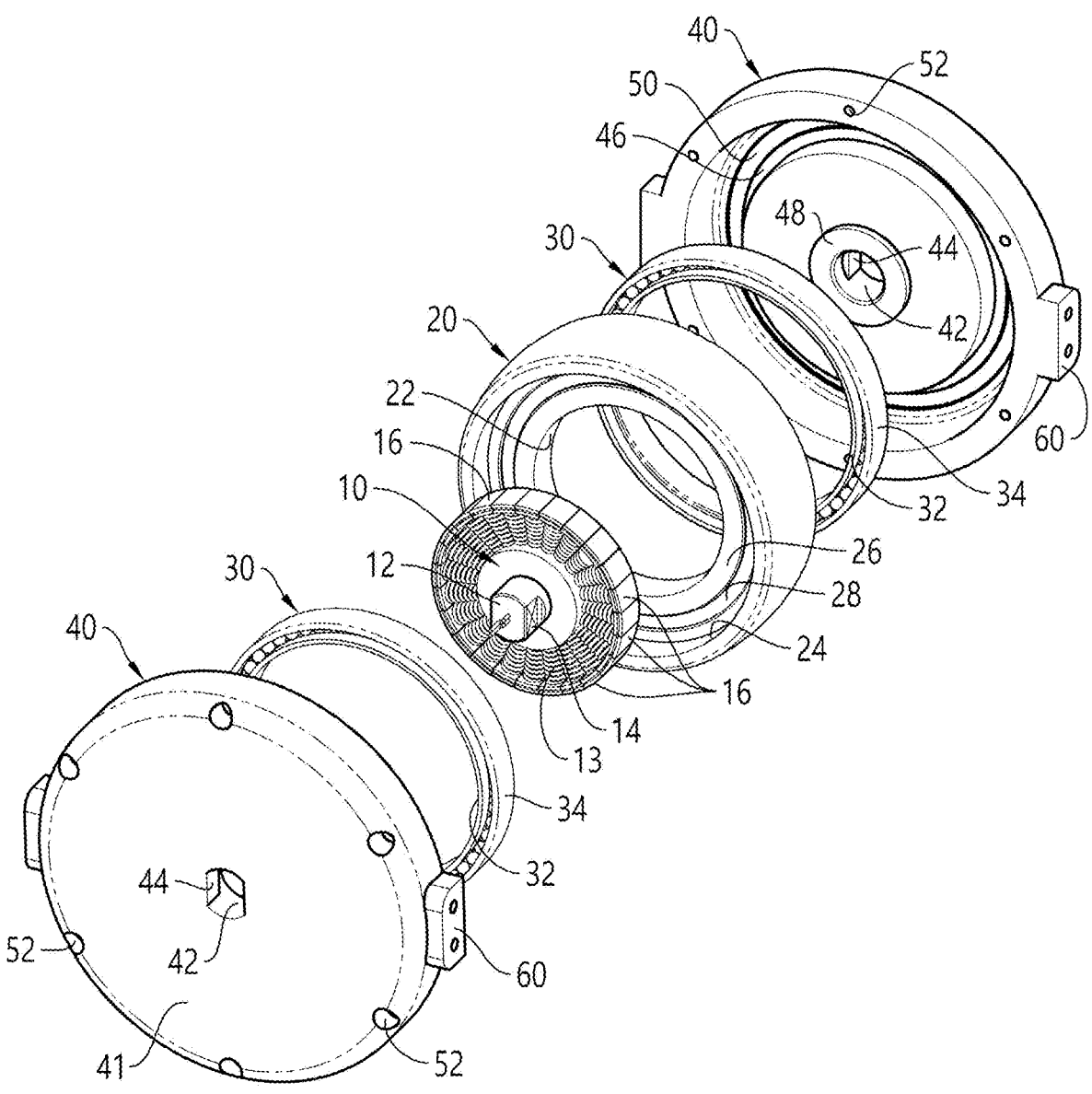
FIG. 2 is an exploded view for explaining main components of the orientation-stabilizing device according to an embodiment of the present invention.
Figure 3:
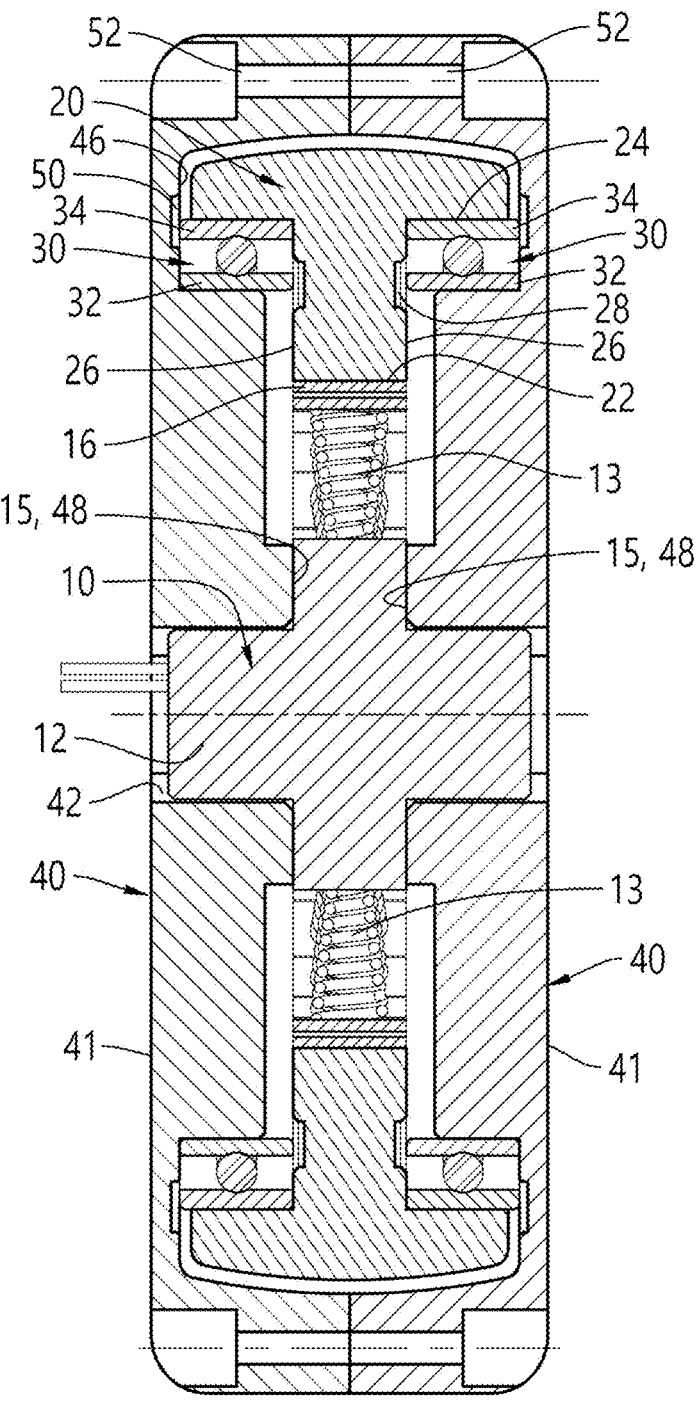
FIG. 3 is a sectional view for explaining the main components of the orientation-stabilizing device according to an embodiment of the present invention.
Figure 4:
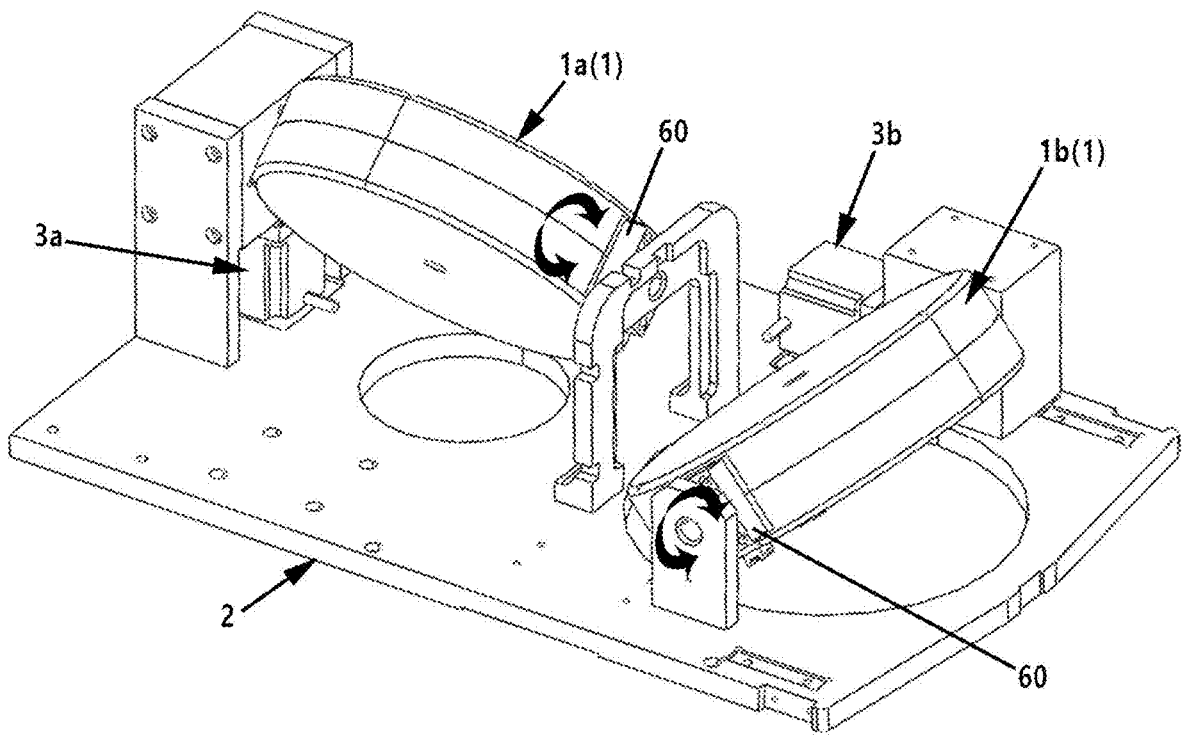
FIG. 4 is a diagram for illustrating an example of the installation of the orientation-stabilizing device according to an embodiment of the present invention.
Figure 5:
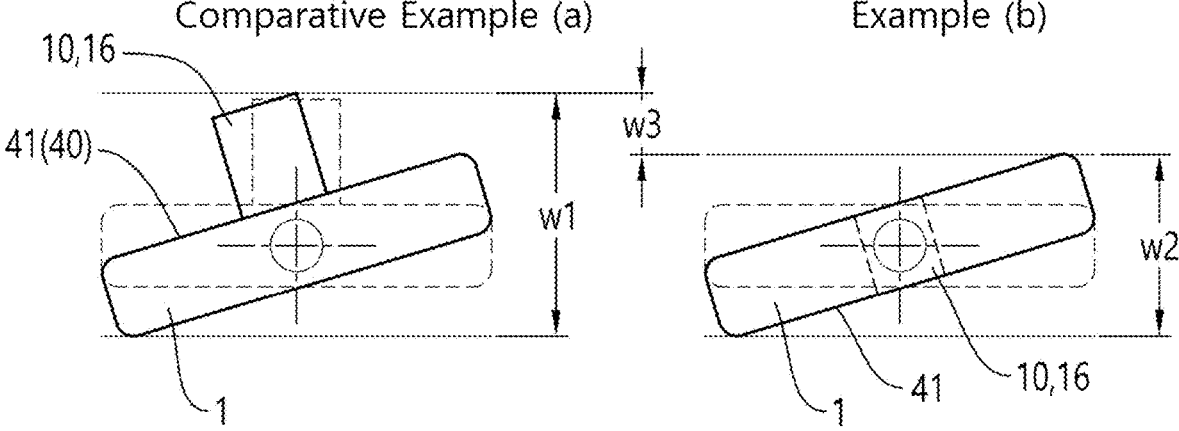
FIG. 5 is a diagram for illustrating the effects of the orientation-stabilizing device according to an embodiment of the present invention.

Hereinafter, an orientation-stabilizing device according to an embodiment of the present invention will be described with reference to FIGS. 1 to 5. FIG. 1 is a diagram for illustrating an orientation-stabilizing device according to an embodiment of the present invention. FIG. 2 is an exploded view for explaining main components of the orientation-stabilizing device according to an embodiment of the present invention. FIG. 3 is a sectional view for explaining the main components of the orientation-stabilizing device according to an embodiment of the present invention. FIG. 4 is a diagram for illustrating an example of the installation of the orientation-stabilizing device according to an embodiment of the present invention. FIG. 5 is a diagram for illustrating the effects of the orientation-stabilizing device according to an embodiment of the present invention.

The orientation-stabilizing device according to an embodiment of the present invention may be configured to include a motor stator 10, a motor rotor 16, a flywheel 20, a bearing 30 and a cover 40.

As shown in FIGS. 2 and 3, the motor stator 10 has a coil 13 disposed on the outer circumferential surface of a center shaft 12, and the coil 13 becomes magnetized when electricity flows through it.

As shown in FIGS. 2 and 3, the motor rotor 16 is disposed outside the coil 13 and is composed of a permanent magnetic material.

That is, when magnetism is generated in the coil 13 of the motor stator 10, the motor rotor 16 may rotate in response to the magnetic field.

As shown in FIG. 3, the motor rotor 16 is fixed to a central inner circumferential surface 22 of the flywheel 20. Accordingly, when the motor rotor 16 rotates, the flywheel 20 rotates together with the motor rotor 16.

As shown in FIG. 3, the cover 40 is installed on the center shaft 12 and surrounds the flywheel 20.

As shown in FIG. 3, the bearing 30 is installed between the flywheel 20 and the cover 40, allowing the flywheel 20 to rotate in an aligned state inside the cover 40.

In particular, the orientation-stabilizing device according to an embodiment of the present invention is configured such that the motor stator 10 and the motor rotor 16 do not protrude toward the surface 41 of the cover 40, as shown in FIGS. 1 and 3.

The orientation-stabilizing device according to an embodiment of the present invention configured as described above may be installed on an object, as shown in FIG. 4. The object may be a personal mobility device, an unmanned delivery robot, or the like.

Two stabilizers 1 may be installed on a base plate 2, and a first stabilizer 1a and a second stabilizer 1b may be arranged such that their tilting axes are oriented perpendicular to each other.

The first stabilizer 1a has coupling parts 60 formed on both sides of its tilting axis. One of the coupling parts is connected to a motor shaft of a first motor 3a, and the other is installed on a fixed bracket.

The second stabilizer 1b, like the first stabilizer 1a, has coupling parts 60 formed on both sides of its tilting axis. One of the coupling parts is connected to a motor shaft of a second motor 3b, and the other is installed on a fixed bracket.

The object may tilt due to external factors. For example, if the object tilts in the direction in which the first stabilizer 1a tilts, the first motor 3a operates to tilt the first stabilizer 1a in the opposite direction. Here, the first stabilizer 1a generates a force that allows the orientation of the object to return to its correct orientation, thereby gradually guiding the object's orientation to converge toward the proper orientation.

If the first stabilizer 1a operates in response to the object tilting in the left-right direction, the second stabilizer 1b may operate in response to the object tilting in the front-rear direction.

That is, since the stabilizer 1 should perform a tilting operation at an appropriate angle to restore the orientation of the object to its proper orientation, sufficient space should be secured to avoid interference with other components.

FIG. 5 illustrates a comparative example and an embodiment. In the comparative example, the stabilizer 1 has a motor configuration in which, for example, the motor stator 10 and the motor rotor 16 protrude outward beyond a surface 41 of the cover 40.

In the embodiment, the motor stator 10 and the motor rotor 16 are arranged inside the cover 40 as described above, so that they do not protrude from the surface 41 of the cover 40, resulting in a flat surface configuration.

When both the comparative example (a) and the example (b) are tilted at the same angle, the comparative example (a) requires a first space w1, and the example (b) requires a second space w2, wherein the first space w1 is larger than the second space w2 by a third space w3.

The reason the comparative example (a) requires an additional space by the third space w3 is that the motor configuration, such as the motor stator 10 and the motor rotor 16, protrudes outward from the surface 41 of the cover 40.

Accordingly, the orientation-stabilizing device according to an embodiment of the present invention may reduce the external size of the orientation-stabilizing device by arranging the motor components inside the cover 40. As a result, the occupied space within the object may be minimized, and the tilting range may be maximized within allowable spatial limits. This provides the effect of enabling faster and more accurate correction of the object's orientation, even when the object is significantly tilted.

Meanwhile, in the orientation-stabilizing device according to an embodiment of the present invention, an outer ring 34 of the bearing 30 may be installed on the inner circumferential surface 24 of the flywheel 20, and an inner ring 32 of the bearing 30 may be installed on the cover 40, as shown in FIG. 3.

As a result, the mass distribution of the flywheel 20 may be positioned outward from the bearing 30 and farther from the center of rotation of the flywheel 20. This allows the rotational inertial kinetic energy to be maximized when the flywheel 20 rotates, and the greater the rotational inertial kinetic energy, the more effectively it can contribute to correcting the tilt orientation of the object.

In addition, the orientation-stabilizing device according to an embodiment of the present invention may be configured such that a first clearance groove 28 is formed on a first side surface 26 of the flywheel 20 to prevent the inner ring 32 from interfering with the flywheel 20, and a second clearance groove 50 is formed on a second side surface 46 of the cover 40 to prevent the outer ring 34 from interfering with the cover 40, as shown in FIG. 3.

That is, when the flywheel 20 rotates, it may do so without receiving resistance from the stationary cover 40. Even when the same amount of electrical energy is supplied to the coil 13, the flywheel 20 may rotate stably with minimal energy loss, thereby improving electrical energy efficiency.

On the other hand, in the orientation-stabilizing device according to an embodiment of the present invention, a first key 14 may be formed at an end of the center shaft 12, and a second key 44 may be formed in a center hole 42 of the cover 40, as shown in FIG. 2.

When the first key 14 and the second key 44 are assembled, the motor stator 10 and the cover 40 may be fixed to prevent relative rotation between them.

When the flywheel 20 undergoes rotational motion, a force is generated that tends to rotate the cover 40 in the same direction as the flywheel 20. If unintended movement of the cover 40 occurs, it may lead to energy loss.

However, in the orientation-stabilizing device according to an embodiment of the present invention, 0 the center shaft 12 and the cover 40 are assembled together using the first and second keys 14 and 44 as described above, thereby maintaining a secure assembled state. As a result, when magnetism is generated by the electrical energy supplied to the coil 13, the magnetic force is fully utilized to rotate the flywheel 20, ultimately improving electrical energy efficiency.

On the other hand, in the orientation-stabilizing device according to an embodiment of the present invention, a third side surface 48 may be formed on the inner side of the cover 40 around the center hole 42 as shown in FIGS. 2 and 3, and the third side surface 48 may be in close contact with a shaft side surface 15 of the center shaft 12 as shown in FIG. 3, thereby allowing the motor stator 10 and the cover 40 to be fixed so as not to move in the longitudinal direction of the center shaft 12.

When the flywheel 20 rotates at high speed inside the cover 40, vibrations may occur if the respective components are not securely fastened, and such vibrations may weaken the rotational inertial energy.

In the orientation-stabilizing device according to an embodiment of the present invention, vibration may be prevented by ensuring that the covers 40 on opposite sides are fixed in close contact with the center shaft 12 as described above. As a result, the magnetic force generated by the coil 13 may be concentrated solely on driving the flywheel 20, thereby preventing energy loss and ultimately enhancing the efficiency of stabilizing the orientation of the object.

As shown in FIGS. 1 to 3, the covers 40 on the opposite sides may be formed with fastening holes 52, and may be securely fastened using fastening elements such as bolts inserted into the fastening holes 52.

While exemplary embodiments of the present invention have been described above with reference to the accompanying drawings, it will be understood by those skilled in the art that the present invention may be implemented in various other specific forms without departing from the technical spirit or essential characteristics of the invention.

Therefore, the embodiments described above are to be understood as illustrative and not restrictive in all respects. The scope of the present invention is defined by the claims set forth below, and all modifications or variations derived from the meaning, scope, and equivalents of the claims should be construed as being included within the scope of the present invention.

INDUSTRIAL APPLICABILITY

An orientation-stabilizing device according to an embodiment of the present invention can be installed on an object and used to correct the orientation of the object when it becomes tilted.

The invention claimed is:

1. An orientation-stabilizing device, comprising:

a first stabilizer and a second stabilizer; and a base plate on which the first and second stabilizers are installed, wherein the first stabilizer has coupling parts formed on both sides of an inclined axis of the first stabilizer, a first coupling part of the first stabilizer is connected to a first motor shaft of a first motor, and a second coupling part of the first stabilizer is installed on a first bracket, wherein the second stabilizer has coupling parts formed on both sides of an inclined axis of the second stabilizer, a third coupling part of the second stabilizer is connected to a second motor shaft of a second motor, and a fourth coupling part of the second stabilizer is installed on a second bracket, wherein the inclined axes of the first and second stabilizers are arranged to be orthogonal to each other, and wherein the first stabilizer and/or the second stabilizer comprises:

a motor stator having a coil disposed on an outer circumferential surface of a center shaft, the coil being magnetized when electricity flows through it;

a motor rotor made of a permanent magnetic material, disposed outside the coil, and configured to rotate in response to the magnetism;

a flywheel having a central inner circumferential surface fixed to the motor rotor to rotate together with the motor rotor;

a cover installed on the center shaft and configured to surround the flywheel; and a bearing installed between the flywheel and the cover, and configured to allow the flywheel to rotate in an aligned state inside the cover, wherein the motor stator and the motor rotor do not protrude toward a surface of the cover, wherein an outer ring of the bearing is installed on an inner circumferential surface of the flywheel, and an inner ring of the bearing is installed on the cover, and wherein a first key is formed at an end of the center shaft, a second key is formed in a center hole of the cover, and the first key and the second key are assembled so that the motor stator and the cover are fixed together to prevent relative rotation.

2. The orientation-stabilizing device according to claim 1, wherein a first clearance groove is formed on a first side surface of the flywheel to prevent the inner ring from interfering with the flywheel, and a second clearance groove is formed on a second side surface of the cover to prevent the outer ring from interfering with the cover.

3. The orientation-stabilizing device according to claim 1, wherein a third side surface is formed around the center hole inside the cover, and the third side surface is in close contact with a shaft side surface of the center shaft, thereby fixing the motor stator and the cover so that they do not move in a longitudinal direction of the center shaft.

* * * * *